United States Patent Office 3,085,582
Patented Apr. 16, 1963

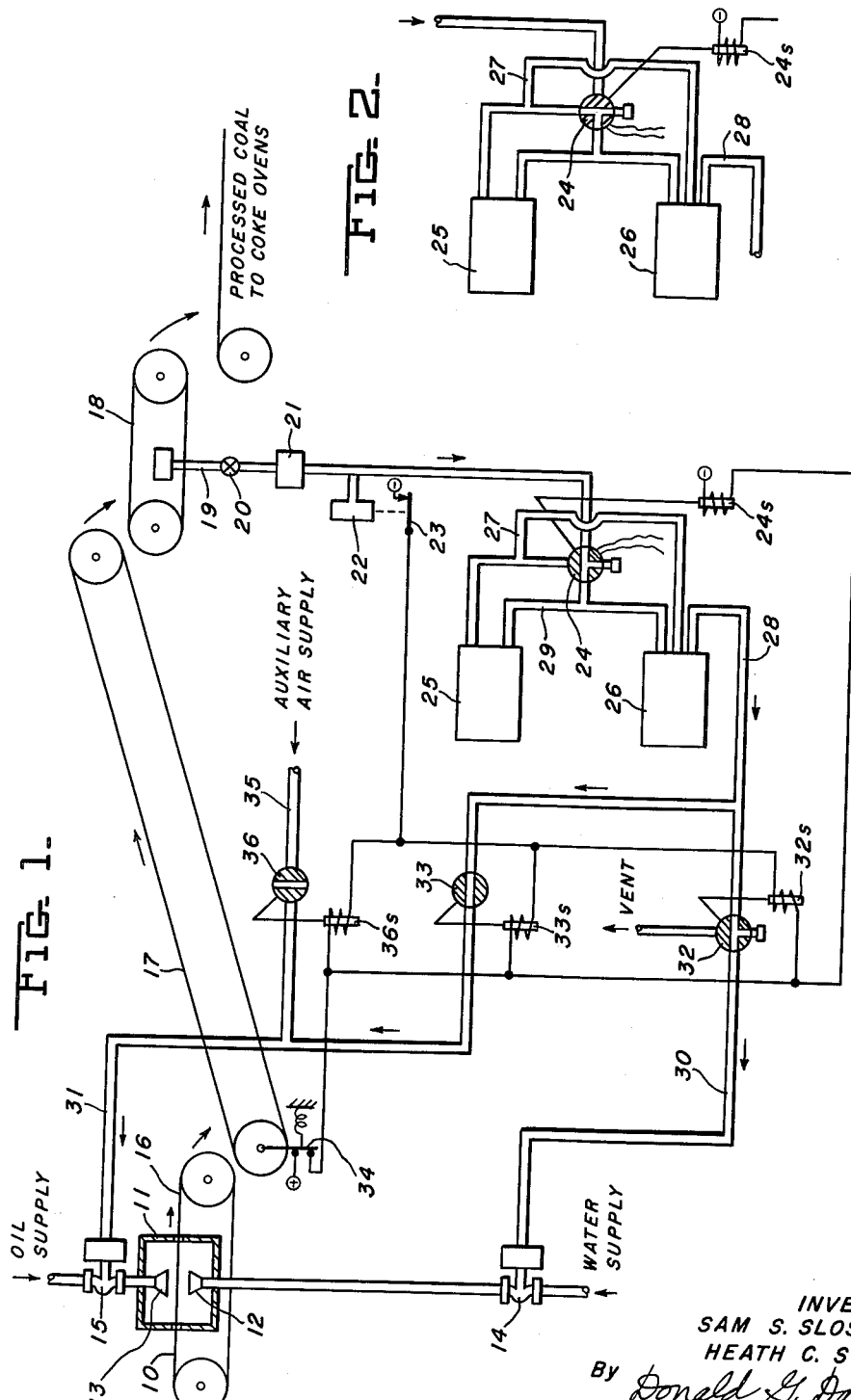

3,085,582
METHOD AND APPARATUS FOR CONTROLLING THE BULK DENSITY OF COAL
Sam S. Slosman, Boone Township, Porter County, and Heath C. Strachan, Munster, Ind., assignors to United States Steel Corporation, a corporation of New Jersey
Filed Apr. 30, 1962, Ser. No. 191,030
5 Claims. (Cl. 134—57)

This invention relates to a system for controlling the bulk density of coal.

It is known that the bulk density of coal charged into coke ovens varies considerably because of a number of factors and that it may be controlled by the addition of limited amounts of water and oil, to increase the operating efficiency of the coke plant. It is an object of our invention to provide an automatic system of control to achieve and maintain the optimum bulk density of the coal as it is charged into the ovens. A further object is to provide a pneumatic control system free from the complexity and maintenance problems encountered in other types of systems. A still further object is to control the addition of water as well as oil.

In a preferred embodiment and practice, we continuously determine the bulk density of the coal being delivered to the ovens, generate a pneumatic signal proportional thereto and apply the signal to a set-point pressure recorder and transmitter and a controller which, in turn actuate valves for varying the amounts of oil and water sprayed onto the coal and mixed therewith upstream from the point at which the bulk density is measured.

A complete understanding of the invention may be obtained from the following detailed description and explanation which refer to the accompanying drawings illustrating the present preferred embodiment. In the drawings:

FIGURE 1 is a schematic diagram of the system of our invention; and

FIGURE 2 is a partial diagram showing a change in the connections between the transmitter and controller when the coal-preparation plant has to be shut down for any reason.

Referring now in detail to the drawings, coal for cokeoven feed is delivered by a conveyor 10 to a paddle mixer 11 provided with water and oil spray nozzles 12 and 13, respectively. The nozzles are connected to suitable sources of water and oil through valves 14 and 15. The latter are pneumatically operated valves such as those made by Conoflow Corp., Philadelphia, Pa., designated series LB split-body valves. Valve 14 is connected so as to open as pneumatic pressure is applied to the operating mechanism. Valve 15 is connected to close as the control pressure increases to a maximum. After being mixed with the required amounts of water or oil, the coal is discharged from mixer 11 onto a conveyor 16 which transfers it to a conveyor 17.

Conveyor 17 delivers coal to a sampler 18 which has means for continuously determining the bulk density thereof and generating a proportional pneumatic signal pressure. Sampler 18 may be the model 36-20W "PneuWeigh" weigher made by Omega Machine Co. Providence, R.I. The sampler maintains in a pipe 19 an air pressure of from 3 to 15 p.s.i., proportional to a range of measured bulk density, i.e., from 40 to 50 p.c.f. A needle valve 20 and a surge chamber 21 are connected in pipe 19 for controlling the air flow and smoothing out extreme variations in pressure, respectively. A pressure relay 22 is also connected to pipe 19 and holds its contact 23 closed so long as a minimum pressure, i.e., 4 p.s.i., exists in the line. The purpose of this relay will be explained later.

Pipe 19 extends through a control valve 24 to a recordertransmitter 25 and a controller 26. Valve 24 is a 3-way solenoid valve such as that made by Skinner Electric Valve Division, Skinner Precision Industries, Inc., New Britain, Conn. Recorder 25 is a pressure-sensitive setpoint transmitter and recorder such as the "Consotrol" model 54 made by The Foxboro Co., Foxboro, Mass. Controller 26 may be the force-balance receiver-controller model 58 made by The Foxboro Co. When valve 24 is in the position shown in FIGURE 1, the recorder 25 responds to variations of the pressure in pipe 19 and transmits a corresponding input pressure through pipe 27 to controller 26. The latter applies an amplified control pressure to pipe 28, depending on the difference between the pressure received directly from pipe 19 through pipe 29 and that transmitted through pipe 27. The pneumatic pressure applied to pipe 28 operates valves 14 and 15, through pipes 30 and 31, under the control of valves 32 and 33 therein. Valve 32 is similar to valve 24 and valve 33 is of the same type but of the two-way variety.

Variations in the pressure signal from sampler 18 are effective, by the apparatus described above, to operate valves 14 and 15 so as to correct for departures of the bulk density of the coal arriving at the sampler from a desired value. The recorder-transmitter 25 is manually set for this value and operates as described in response to changes in the pressure in pipe 19. Valve 14 is closed when the pressure in pipe 28 is a minimum (e.g., 9 p.s.i.) and fully open when that pressure is a maximum (e.g., 15 p.s.i.). Valve 15, however, is closed on a maximum pressure (e.g., 9 p.s.i.) in pipe 28 and open on a minimum pressure (e.g., 3 p.s.i.).

Valves 24, 32 and 33 are held in the positions in which they are illustrated in FIGURE 1 by the energization of their solenoids 24s, 32s and 33s, respectively. We provide means for interrupting the energizing circuits of these solenoids when the system is shut down as evidenced by the stoppage of conveyor 17. This means is a switch 34 actuated by the conveyor, which is closed when the conveyor is moving and open when it is stopped. The energizing circuit, furthermore, includes the aforesaid relay contact 23, which takes the control system out of operation when the signal pressure in pipe 19 falls below a predetermined minimum, when it is no longer reliable.

The closing of valves 32 and 33 in response to stoppage of conveyor 17 cuts off the control pressure from valves 14 and 15. This, if not forestalled, would let valve 15 open fully. To prevent such result, we provide an auxiliary pressure source and a pipe 35 therefrom connected to pipe 31 and containing a valve 36 like valve 33, except that it is opened instead of being closed, on deenergization of its solenoid 36s. This solenoid is connected in parallel with solenoids 32s and 33s. The pressure admitted from pipe 35 to pipe 31 by the opening of valve 36 is sufficient to hold valve 15 closed during the shutdown period.

Valve 24 moves from the position shown in FIGURE 1 to that shown in FIGURE 2, on deenergization of its solenoid 24s by the opening of switch 34 or relay contact 23. This cuts off the connection of transmitter-recorder 25 to pipe 19 and holds controller 26 in fixed relation to the recorder for the shut-down period. It will be observed from FIGURE 2, that when valve 24 operates as described, the recorder and controller are so interconnected as to maintain a balanced condition therebetween which precludes the controller from making any change in the pressure in pipe 28.

The system of our invention has numerous advantages. It is wholly pneumatic in principle except for the valveoperating solenoids, and is simple to adjust and maintain. It affords infinitely variable control, not limited to definite steps, thus adapting it to precise correction for the several factors affecting bulk density, i.e., degree of pulverization of the coal, the moisture content, the oil content, and the blend thereof. The system insures that the bulk density of the coal charge to the coke ovens will be not only more uniform but nearer the optimum value than it would be without the automatic correction effected by our invention. Thus the overall efficiency of the coke plant is enhanced.

The transmitter-recorder 25 includes a manual adjustment and may thus be used for manual control by switching it from automatic to manual operation.

Although we have disclosed herein the preferred embodiment and practice of our invention, we intend to cover as well any change or modification therein which may be made without departing from the spirit and scope of the invention.

We claim:
1. In apparatus for controlling the bulk density of coal including a mixer and a conveyor adapted to carry coal away from the mixer, the combination therewith of pneumatically operated valves controlling the admission of oil and water to said mixer, a sampler located to receive coal from the conveyor and adapted to deliver a pneumatic measuring signal proportional to the bulk density of the coal passing thereover, means responsive to said signal effective to generate a pneumatic control signal proportional to variations of the measured bulk density from a predetermined value, and means connecting said last-mentioned means to the operating mechanisms of said valves, respectively, whereby variations in the bulk density of coal passing over the sampler cause corrective adjustments of the amounts of oil and water fed to the coal in the mixer.

2. Apparatus as defined in claim 1, characterized by said first-mentioned means including a set-point transmitter and controller.

3. Apparatus as defined in claim 2, characterized by valve means operated on stoppage of said conveyor effective to disconnect said transmitter and controller from said sampler and to connect them in a static balance condition.

4. Apparatus as defined in claim 2, characterized by valve means operated on stoppage of said conveyor effective to disconnect said pneumatically operated valves from said controller.

5. Apparatus as defined in claim 2, characterized by an auxiliary source of pneumatic pressure and valve means operated on stoppage of said conveyor effective to connect said auxiliary source to the oil-valve operating mechanism.

References Cited in the file of this patent
UNITED STATES PATENTS

| | | |
|---|---|---|
| 2,378,420 | Lohr | June 19, 1945 |
| 2,510,158 | Van Ackern | June 6, 1950 |
| 2,765,266 | Throop | Oct. 2, 1956 |